Dec. 27, 1955         C. SHEER ET AL         2,728,128
METHOD OF PRODUCING BORON CARBIDE ARTICLES AND PRODUCT THEREOF
Filed Nov. 29, 1951

INVENTORS
CHARLES SHEER
JAY TITTMAN
BY

ATTORNEY

United States Patent Office 2,728,128
Patented Dec. 27, 1955

2,728,128

METHOD OF PRODUCING BORON CARBIDE ARTICLES AND PRODUCT THEREOF

Charles Sheer, New York, N. Y., and Jay Tittman, West Orange, N. J., assignors to the United States of America as represented by the United States Atomic Energy Commission Application November 29, 1951, Serial No. 258,781

10 Claims. (Cl. 25—157)

This invention relates to the manufacture of shaped articles from refractory carbides and more particularly to a method of forming such articles from boron carbide and to the composition produced thereby that is especially useful as a neutron shield.

The manufacture of shaped articles from the refractory carbides has always been a difficult and expensive task. For example, boron carbide to which this invention is particularly directed is molded only under high pressure at temperatures of the order of 2400° C. A special atmosphere of an inert or reducing gas is specified to suppress the formation of boron oxide. The application of high pressures at so high a temperature in itself poses many mechanical problems that have expensive solutions. On the other hand, some carbides are consolidated at a relatively lower temperature by the addition of a metallic binder. For example, silicon and tungsten carbides are usually bonded with a ferrous metal, such as cobalt, by heating the powdered carbide with the finely divided metal at a temperature above the melting point of the metal. While such a process is relatively less expensive, its cost still runs high.

In certain applications metal bonding of boron carbide particularly has its own disadvantages. Boron carbide has in recent years been found to be especially useful as a neutron shielding material. The compound is refractory and contains a high percentage of boron, an element that readily absorbs relatively low energy neutrons. While other elements as well have a high affinity for neutrons, that is, a high capture cross section, boron is particularly effective in a neutron shield. The reason for this lies in the properties of the neutron-absorbing nucleus of boron subjected to neutron bombardment.

When a neutron is absorbed by the boron nucleus, almost the only reaction is the emission of an alpha particle. Because of its high charge and relatively large mass, an alpha particle has only a very short range even in such disperse materials as air. Thus the radioactivity emitted when boron absorbs neutrons is, relatively speaking, negligible. On the other hand, most of the other elements emit beta or gamma particles or both after absorbing neutrons. Beta particles which have relatively low charge and mass and especially gamma particles which are really highly energetic photons are extremely penetrating. When elements that emit beta or gamma activity on absorbing neutrons are placed in a neutron flux they usually become dangerously radioactive themselves. The nucleus of cobalt, for example, which is often used as a metallic binder for carbides, absorbs a neutron to form the isotope cobalt-60. This isotope emits three very penetrating gamma rays and a beta particle as it decays radioactively to the stable isotope nickel-60.

In addition to the reaction obtained when a neutron is absorbed, the nuclei of most elements, particularly the bonding metals, have a high scattering cross-section relative to their absorption cross-section for neutrons. In other words, a relatively large proportion of the incident neutrons, instead of being absorbed by the nuclei, are reflected elastically by them. The result is the passage of a portion of the incident neutrons through the material without being absorbed. That is to say, that the portion of the incident neutrons absorbed may cause the reactions described in the last paragraph while another portion is not absorbed and emerges from the element. Most of the common metals have this property of a relatively high ratio of scattering to absorption of neutrons. Boron carbide, on the other hand, is useful primarily because the scattering-to-absorption ratio is very low so that by far the greatest proportion of incident neutrons are absorbed rather than scattered. For these reasons, the use of metallic binders for boron carbide is prohibited when the carbide is to be employed for neutron shielding.

Accordingly, it is a principal object of this invention to provide a simple, inexpensive method of forming shaped articles of boron carbide.

Another object of the invention is to provide a relatively inexpensive neutron shielding composition.

Still another object is to provide a method of forming shaped articles from boron carbide without using materials that deleteriously affect its neutron shielding qualities.

A further object is to provide a neutron shielding material that has a low scattering cross-section for neutrons.

A secondary object of the invention is to reduce the cost of the equipment needed to fabricate shape articles of boron carbide.

Other objects of the invention will appear as the description proceeds.

The objects of this invention are reached, generally speaking, by the following method: A plastic mixture of finely divided boron carbide and water is cold molded in a somewhat conventional way to form a dimensionally stable wet article. Without drying the article, it is heated in an oxygen-containing atmosphere to a temperature in the range of 600° C. to 1000° C. Thereby, a minor portion of the boron carbide is oxidized to boron oxide which is melted by the heat. When the baked article is cooled the boron oxide, which preferably is not less than 10% nor more than 20% by weight of the final composition, solidifies and serves as a vitreous binder for the boron carbide.

The accompanying drawings illustrate diagrammatically typical apparatus for and a method of molding the plastic boron carbide-water mix into rectangular bricks. In the drawings.

In carrying out the present method, finely divided boron carbide is initially mixed with just about enough water to thoroughly wet the particles but not enough to result in a fluid mixture. That is to say, the water and boron carbide mix is plastic: it is readily deformable by manual pressure but it is capable of retaining the shape into which it is formed. We have found that it is not necessary to specify a precise numerical value for the proportions of water and boron carbide. Instead, these proportions may be judged by the consistency of the mix, and an entirely satisfactory composition is one that has approximately the consistency of ordinary modeling clay.

The wet plastic mix is then cold molded at room temperature. In order to form a dimensionally stable wet article that can be handled, a pressure of more than 2000 pounds per square inch should be used, but preferably not more than 20,000 pounds per square inch. A pressure of the order of 8000 pounds per square inch has been found satisfactory. In a general way, the density of the finished product depends on the pressure used, increasing as the molding pressure is increased.

Figure 1:
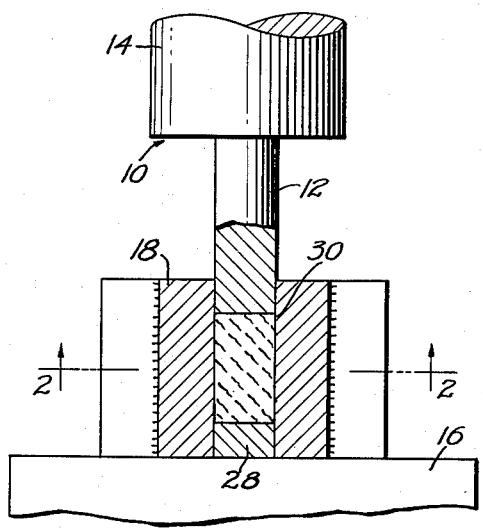
Figure 1 is a vertical, diagrammatic elevation, mainly in section, of a press and mold containing a molded charge of wet boron carbide.
Figure 2:
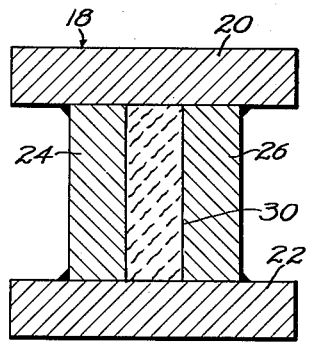
Figure 2 is a horizontal section of the brick mold taken on the line 2—2 of Figure 1.

The wet plastic mix is molded into bricks in apparatus of the type illustrated in the accompanying drawings. As shown in Figures 1 and 2, the apparatus comprises a hydraulic press 10 having a platen 16 and a plunger 12 emerging from the hydraulic cylinder 14. Supported on the platen 16 there is a rectangular mold 18 which, as shown more clearly in Figure 2, is formed by two parallel end members 20 and 22 between which are two parallel cross members 24 and 26 secured to the end members as by welding. The parallel end members 20 and 22 and cross members 24 and 26 delineate the rectangular molding volume cross-section. The floor of the mold is a rectangular bar 28 which is removable from the mold and is supported directly on the press platen 16. The press plunger 12 has of course a rectangular cross section to fit the mold 18.

In operation, the mold 18 is first positioned on the press platen 16. Then the floor bar 28 is inserted in the mold to serve as the compression seat. Then the charge 30 of the plastic wet boron carbide-water mix is placed in the mold on the floor bar 28 and pressure is applied by means of the plunger 12 to form the green brick 30. As the pressure is applied, a portion of the water is expressed from the plastic mix and escapes through small clearances, of the order of 5 mils, left between the mold walls and the plunger and floor bar.

Figure 3:
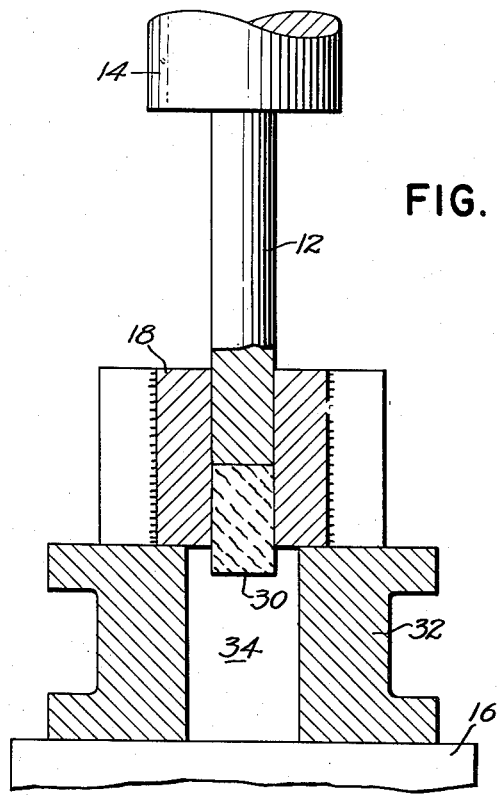
Figure 3 is a vertical, diagrammatic elevation, mainly in section, of the press and mold of Figures 1 and 2, and it illustrates a method of removing the molded brick from the mold.

The removal of the green brick from the mold is illustrated in Figure 3. The mold 18 containing the green brick is placed on a stand 32 having an opening 34 capable of receiving the green brick. The mold is positioned to align it with the stand opening 34. To remove the green brick from the mold, a light steady pressure is applied to the plunger 12 after removal of the floor bar 28. The green brick is thus forced through the bottom of the mold into the opening 34. In this operation it is well to avoid sudden shocks or vibration which may damage the brick. At this point the molded brick still contains a substantial amount of water, but it is easily handled and is no longer plastic. The brick is now ready for baking in the oxygen atmosphere.

Molded bricks are stacked, preferably on an asbestos tray, and placed in a pre-heated furnace for baking. The heating may be done in air or in an artificial atmosphere containing oxygen preferably diluted with an inert gas. Upon heating in this atmosphere a minor portion of the boron carbide is converted to boron oxide and this boron oxide is melted to form a vitreous binder for the boron carbide particles. We have found atmospheric air to be most satisfactory for this purpose and we prefer it because no special precautions or equipment are required.

Before the molded articles are baked, it is preferable to dust them with powdered carbon to prevent sticking and to suppress to some extent surface oxidation by the oxygen-containing atmosphere.

The temperature of the baking step is extremely critical and must be kept within the range of 600° C. to 1000° C. The lower end of the temperature range is determined by the melting point of the boron oxide which is about 577° C. In order to assure a strongly bonded article it is necessary to make certain that the boron oxide is completely melted during heating. The upper limit of the temperature range is determined by the rapidity of oxidation of boron carbide. At temperatures much in excess of 1000° C., the boron carbide is oxidized so rapidly on heating in an oxygen-containing atmosphere that the resultant article is substantially useless. For example, when a boron carbide brick was molded in the manner described and heated at 1200° C. for only about one hour, it contained about 46.5% boron oxide and had a surface layer containing about 70% boron oxide. While such a brick is extremely hard and dimensionally stable, it decomposes rapidly on exposure to air. The reason for this is that boron oxide takes up moisture from the air and this weakens the brick. Furthermore, the absorption of water from the air is extremely disadvantageous when the bricks are to be used as neutron shields. This is because the hydrogen of the water molecules has an extremely high scattering cross section for neutrons. That is to say, that the neutrons, instead of being slowed down and absorbed by the shield, are scattered by the hydrogen nuclei. The very high scattering cross-section of the hydrogen vitiates the desirable nuclear properties of the boron carbide.

On the other hand, when the molded articles are heated at a temperature of less than 1000° C. so that the boron oxide content does not exceed about 20% by weight of the composition, the composition surprisingly absorbs substantially no moisture from the air. This has been demonstrated by over 400 bricks prepared as described above at a molding pressure of 8000 pounds per square inch and with a heating cycle in air of one hour at 1000° C. These bricks contained about 12% boron oxide in the body of the brick with about a 1/16-inch surface layer containing approximately 20% boron oxide. In over three years of exposure to a humid atmosphere, the bricks have absorbed substantially no moisture as determined by the measurement of the back-scattering of neutrons by the bricks.

The heating cycle for baking the molded articles is important as well. To assure good bonding, the wet molded article should be heated until the boron oxide content of the article is not less than 10%. We have found that a period of about one to four hours is required when heating in air to dry the bricks, to form the requisite concentration of boron oxide and to melt the boron oxide formed. This time depends on the baking temperature, the shortest time being required at the upper limit of the temperature range.

The process described above produces a dimensionally and chemically stable hard article. The density varies generally with the molding pressure; it is about 1.7 to 1.8 when 8000 pounds per square inch pressure is used and about 2.05 with a pressure of about 18,500 pounds per square inch. To be used in neutron shields, the boron carbide-boron oxide composition should contain not more than 20% nor less than 10% by weight of boron oxide in the body of the article.

Some of the advantages of the present invention are manifest. It is simple and inexpensive; it requires only readily available, inexpensive, commercial equipment; it produces a product that contains a relatively high concentration of boron since diluents are largely eliminated. Furthermore, no special precautions need be taken to prevent oxidation of the boron carbide to boron oxide; indeed the method depends on the formation of the boron oxide. The product has very desirable properties for neutron shielding applications. The boron content of the finished article is not materially diluted by the addition of oxygen since the oxygen content is relatively low, only about 7 to 14%. Oxygen itself has relatively low scattering and absorption cross-sections for neutrons when compared with metal binders and therefore does not materially affect the desirable nuclear properties of the boron carbide.

Since many embodiments might be made of the present invention and since many changes might be made in the embodiment described, it is to be understood that the foregoing description is to be interpreted as illustrative only and not in a limiting sense.

We claim:
1. The method of making shaped articles from boron carbide which comprises cold molding a plastic mixture of finely divided boron carbide and water, thereafter heat- ing the molded mixture without previous drying in an atmosphere containing oxygen at a temperature in the range 600° C. to 1000° C. to convert a minor portion of the boron carbide to boron oxide and to melt the boron oxide and cooling the heated mixture.

2. The method of making shaped articles from boron carbide which comprises cold molding a plastic mixture of finely divided boron carbide and water at a pressure in excess of 2000 pounds per square inch, thereafter, without previous drying, heating the molded mixture in an atmosphere containing oxygen at a temperature in the range 600° C. to 1000° C. to convert a minor portion of the boron carbide to boron oxide and to melt the boron oxide and cooling the heated mixture.

3. The method of claim 2 in which the atmosphere is air.

4. The method of making shaped articles from boron carbide that comprises mixing finely divided boron carbide and water to form a mixture with the plasticity of modeling clay, cold molding the mixture, thereafter, without previous drying, heating the molded mixture in an oxygen-containing atmosphere at a temperature in the range of 600° C. to 1000° C. to convert a minor portion of the boron carbide to boron oxide and to melt the boron oxide, and cooling the heated mixture.

5. The method of forming shaped articles from boron carbide that comprises cold molding a plastic mixture of boron carbide and water, thereafter, without previous drying, heating the molded mixture in an oxygen-containing atmosphere at a temperature in the range 600° C. to 1000° C. to increase the boron oxide content of the molded boron carbide to a value in the range of 10 to 20% by weight by oxidizing a portion of said carbide, continuing the heating to melt said boron oxide and thereafter cooling the boron oxide-boron carbide composition to solidify the boron oxide.

6. The method according to claim 5 in which the plastic mixture of boron carbide and water has the plasticity of modeling clay.

7. The method according to claim 5 in which the molding is carried out at a pressure of at least 2000 pounds per square inch.

8. The method of preparing boron carbide neutron shields comprising forming a plastic mixture of finely divided boron carbide and water with the plasticity of modeling clay, cold molding said mixture at a pressure in the range of 2000 to 20,000 pounds per square inch, thereafter without previous drying, heating the molded mixture in air for a period of one to four hours at a temperature in the range 600° C. to 1000° C. to convert a portion of the boron carbide to boron oxide so as to obtain a boron oxide content in the range of 10 to 20% by weight, and thereafter cooling said mixture.

9. The method of forming shaped articles from boron carbide that comprises cold molding a plastic mixture of finely divided boron carbide and water, dusting the wet molded mixture with powdered carbon, thereafter, without previous drying, heating the molded mixture in an oxygen-containiing atmosphere at a temperature in the range 600° C. to 1000° C. to convert a minor portion of the boron carbide to boron oxide and attain a boron oxide content in the range of 10 to 20% by weight and to melt the boron oxide, and cooling the mixture to solidify said boron oxide.

10. The method of claim 9 in which the oxygen-containing atmosphere is air and the period of heating is one to four hours.

References Cited in the file of this patent

UNITED STATES PATENTS

| | | |
|---|---|---|
| 1,071,488 | Weintraub et al. | Aug. 26, 1913 |
| 1,099,138 | Abbott | June 2, 1914 |
| 1,567,445 | Lubowsky | Dec. 29, 1925 |
| 1,788,146 | Boyles | Jan. 6, 1931 |
| 1,847,101 | Ryschkewitsch | Mar. 1, 1932 |
| 1,926,094 | Goldschmidt et al. | Sept. 12, 1933 |
| 2,188,693 | Thompson | Jan. 30, 1940 |
| 2,205,386 | Balke et al. | June 25, 1940 |
| 2,242,482 | Rennie | May 20, 1941 |

FOREIGN PATENTS

| | | |
|---|---|---|
| 377,090 | Great Britain | July 21, 1932 |
| 419,214 | Great Britain | Nov. 8, 1934 |